United States Patent [19]
Manico et al.

[11] Patent Number: 6,072,980
[45] Date of Patent: Jun. 6, 2000

[54] USING A MULTIPLE IMAGE, IMAGE-AUDIO PRINT TO SELECT AND PLAY CORRESPONDING AUDIO SEGMENTS IN A PHOTO ALBUM

[75] Inventors: Joseph A. Manico, Rochester; David L. Patton, Webster, both of N.Y.

[73] Assignee: Eastman Kodak Company, Rochester, N.Y.

[21] Appl. No.: 09/031,243

[22] Filed: Feb. 26, 1998

[51] Int. Cl.[7] .................................................... G09B 5/00
[52] U.S. Cl. ............................ 434/317; 434/308; 40/455; 281/31
[58] Field of Search .................................... 434/308, 309, 434/317, 319; 40/455; 281/31

[56] References Cited

U.S. PATENT DOCUMENTS

| | | | |
|---|---|---|---|
| 3,744,150 | 7/1973 | Folson | 434/317 |
| 4,465,465 | 8/1984 | Nelson | 434/308 |
| 5,128,700 | 7/1992 | Inoue et al. | |
| 5,313,235 | 5/1994 | Inoue et al. | |
| 5,360,345 | 11/1994 | Brauner et al. | 434/308 |
| 5,365,686 | 11/1994 | Scott | |
| 5,413,355 | 5/1995 | Gonzalez | 434/308 |
| 5,433,610 | 7/1995 | Godfrey et al. | 434/308 |
| 5,466,158 | 11/1995 | Smith, III | 434/308 |
| 5,520,544 | 5/1996 | Manico et al. | 434/308 |
| 5,645,432 | 7/1997 | Jessop | 434/308 |

*Primary Examiner*—Robert A. Hafer
*Assistant Examiner*—Bena B. Miller
*Attorney, Agent, or Firm*—Francis H. Boos, Jr.; Lance Kreisman

[57] ABSTRACT

An album (100) for storing a collection of image prints (94). At least one of the image prints comprises an index print (20) that includes a memory unit (30) integral with the print to define an audio print for storing audio data. The album includes a print holder (90) having respective front and back covers and a plurality of pages (92) configured for mounting the collection. An audio unit (40) is mounted to the print holder. The audio unit includes a housing (42) and an image print processor (60), when the audio print is coupled to the audio unit, to communicate with the audio print memory unit and selectively process audio data related to the collection.

15 Claims, 8 Drawing Sheets

USING A MULTIPLE IMAGE, IMAGE-AUDIO PRINT TO SELECT AND PLAY CORRESPONDING AUDIO SEGMENTS IN A PHOTO ALBUM

CROSS REFERENCE TO RELATED APPLICATIONS

The present application is related to U.S. Application Ser. No. 08/796,323, filed Feb. 7, 1997 by Bell et al., and entitled, "IMAGE AUDIO PRINT METHOD OF MAKING AND PLAYER FOR USING" which claims priority from U.S. Provisional Application Ser. No. 60/025,163, filed Aug. 29, 1996 by Bell et al., and entitled, "IMAGE AUDIO PRINT METHOD OF MAKING AND PLAYER FOR USING" and U.S. application Ser. No. 08/854,022 filed May 8, 1997 by Patton et al., and entitled, "METHOD FOR SEQUENCING FILM IMAGE PRESENTATIONS AND FILM SEQUENCER."

FIELD OF THE INVENTION

The invention relates to an apparatus and method for using an index print as a means to identify and select individual sound segments for playback in an image-audio player. More particularly, the invention relates to such an index print and player in conjunction with a multi-image photo album.

BACKGROUND OF THE INVENTION

Capturing an image for subsequent review often involves activating a camera to record an analog or digital representation of the image. In conventional cameras, the image is typically recorded either as an exposed photographic negative, or as digital data in a memory. Photofinishing of the recorded image generates, in one form, a reproduction of the image superimposed on a paper backing. The reproduction, or print, may then be stored with a collection of prints in a photo album.

Subsequent review of a conventional image print often triggers recall of many of the events related to the image. While this is highly desirable and often the primary reason for capturing the image, any recall is stimulated only by a still, photographic representation.

In an effort to tie-in audio with an image print, those skilled in the art have marketed products known under the name Magic Talking Pictures. The product comprises a plastic frame including audio recording and playback electronics. The frame is formed to mount a single image print and provide the capability of recording audio associated with the print.

A device similar to the Magic Talking Pictures product is disclosed by Scott in U.S. Pat. No. 5,365,686. The patent describes a U-shaped plastic panel having an integral IC memory chip to store audio data. The panel is formed to receive an image print and cooperates with an audio player to record and communicate an audio message associated with the print.

While the above devices work well for their intended uses, they share several common problems. For example, the respective frames or panels typically create an overall thickness that precludes storage of the print, with the audio capability, in a conventional photo album. Moreover, the recordings are typically made long after the photo is taken, requiring a certain level of recall from the user "after-the-fact." Some of the drawbacks associated with the image frame devices above are addressed in the sound photosystem disclosed in U.S. Pat. Nos. 5,128,700 and 5,313,235. The disclosed system includes a camera having the capability of recording audio contemporaneous with capturing the image. Unfortunately, the audio is stored on a detachable IC memory card, and separated from the recorded image. Correlation between the image and the audio is carried out by the camera.

In operation, during audio recording, the camera masks off part of the negative film image, and exposes coded audio address information. The coded area, as part of the negative, then ideally appears in a corner of the photograph or print during photofinishing. To hear the audio, the user must locate the audio memory IC card, insert it into a player apparatus, and then slide the print into the apparatus in a manner that scans the coded audio address.

While the sound photosystem described above allegedly works well for its intended applications, several problems remain. One drawback involves the separate relationship between the print and the audio IC card. Should the two become mixed with other cards and prints, confusion and frustration would occur on the part of the user. This would be especially problematic in the context of photo albums, which have yet to be suggested in the audio image print art.

A further problem with the foregoing sound system concerns the masking of the film to write the audio information on the negative. For instance, photofinishers often fail to print negatives in their entirety. In fact, the positioning of the printed negative varies substantially relative to the edges of the negative and also in the magnified image transfer from negative to print. Thus, it is difficult to ensure that the coded audio address information appears properly on the prints. Moreover, because the masked-off coded area intrudes into the image, the aesthetic quality of the print is often affected. This problem would be compounded considerably in the context of relatively large photo album collections.

Therefore, the need exists for an image print having an integral audio storage unit for storing audio associated with the print and eliminating undesirable separation between the print and the audio. Moreover, the need exists for an image print photo album having the capability of providing audio playback of the image print audio without any aesthetic detraction from the photo album collection. The photo album apparatus and method of the present invention satisfies the above needs.

SUMMARY OF THE INVENTION

The apparatus and method of the present invention provide audio data processing in a photo album relating to a single image print without separating the captured audio data from the print. Moreover, audio corresponding to a particular image in a photo album may be processed in a manner that preserves the aesthetic quality of the album collection.

To realize the above advantages, in one form the invention comprises an album for storing a collection of image prints. At least one of the image prints includes a memory unit integral with the image print to define an audio print for storing audio data. The album includes a print holder having respective front and back covers and a plurality of pages configured for mounting the collection. An audio unit is mounted to the print holder. The audio unit includes a housing and an image print processor to communicate with the audio print memory unit when the audio print is coupled to the player and selectively process audio data related to the collection. In another form, the invention comprises a method of presenting audio information associated with an image print mounted in a photo album as part of an image collection. The photo album includes a sound player. The method includes the steps of first selecting an index print having a plurality of reduced-in-size printed images or icons corresponding to images in the collection. The index print includes an integral audio storage unit for retaining a plurality of audio bites corresponding to said reduced-in-size images or icons. Next, the step of securing the index print to the sound player is carried out. The method concludes by activating a specific sound bite corresponding to a specific image displayed on the index print.

Other features and advantages of the present invention will be apparent from the following detailed description when read in conjunction with the accompanying drawings.

DETAILED DESCRIPTION OF THE INVENTION

Figure 1:
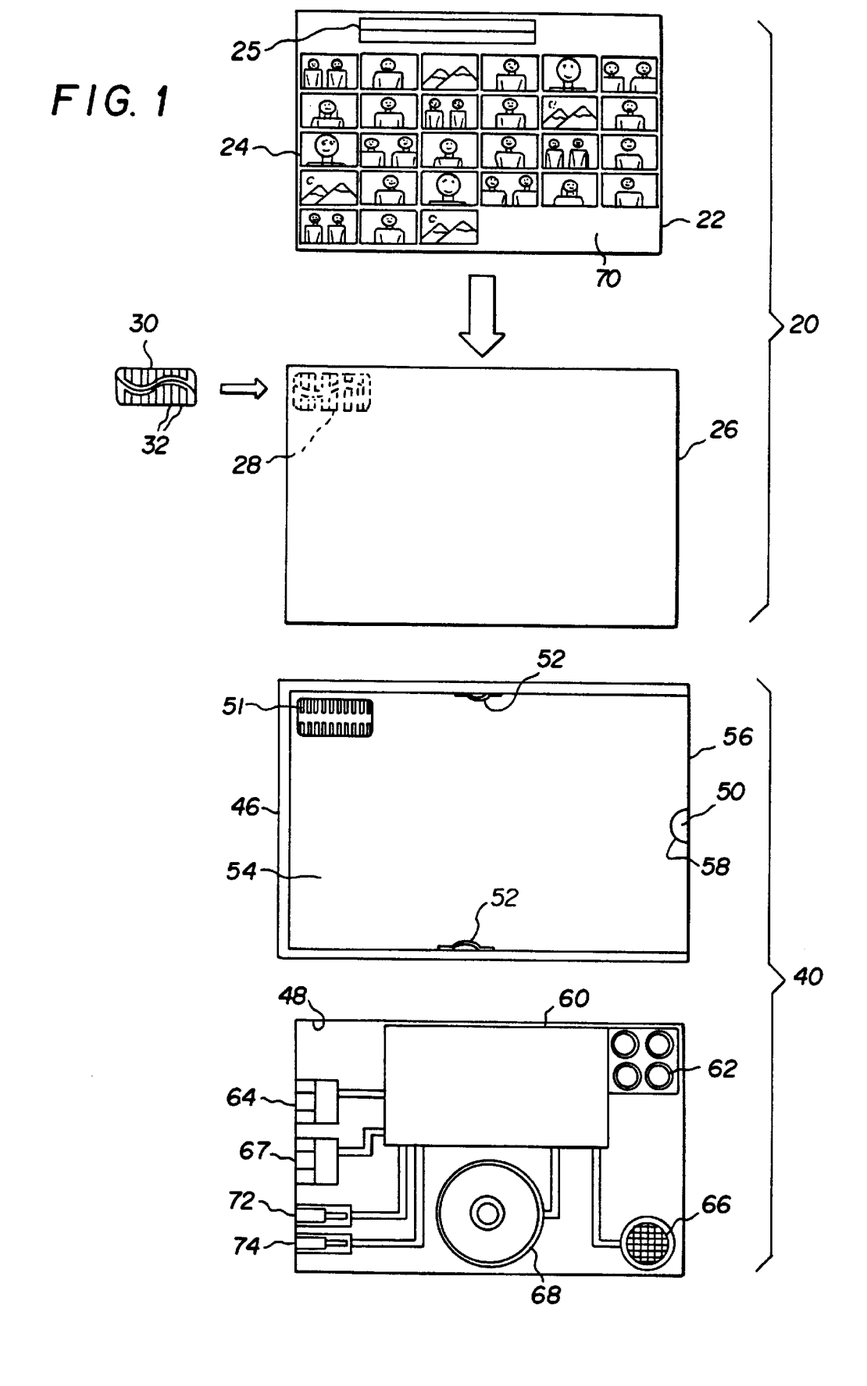
FIG. 1 is an exploded top plan view of an image print and sound player according to one embodiment of the present invention.
Figure 3:
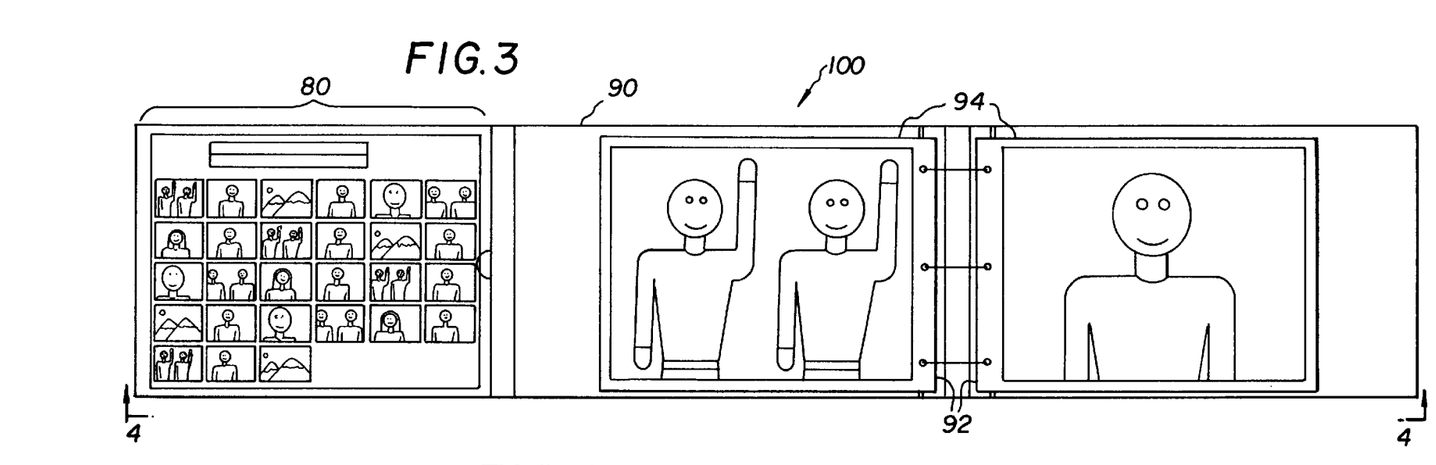
FIG. 3 is a top plan view of an album in an open state according to one embodiment of the present invention.

Referring now to FIGS. 1 and 3, an index print, generally designated 20, is shown with a sound player 40, for use in a photo binder 90 (FIG. 3) so as to effect convenient audio processing of an audio bite relating to a specific image print mounted in the album.

Figure 2:
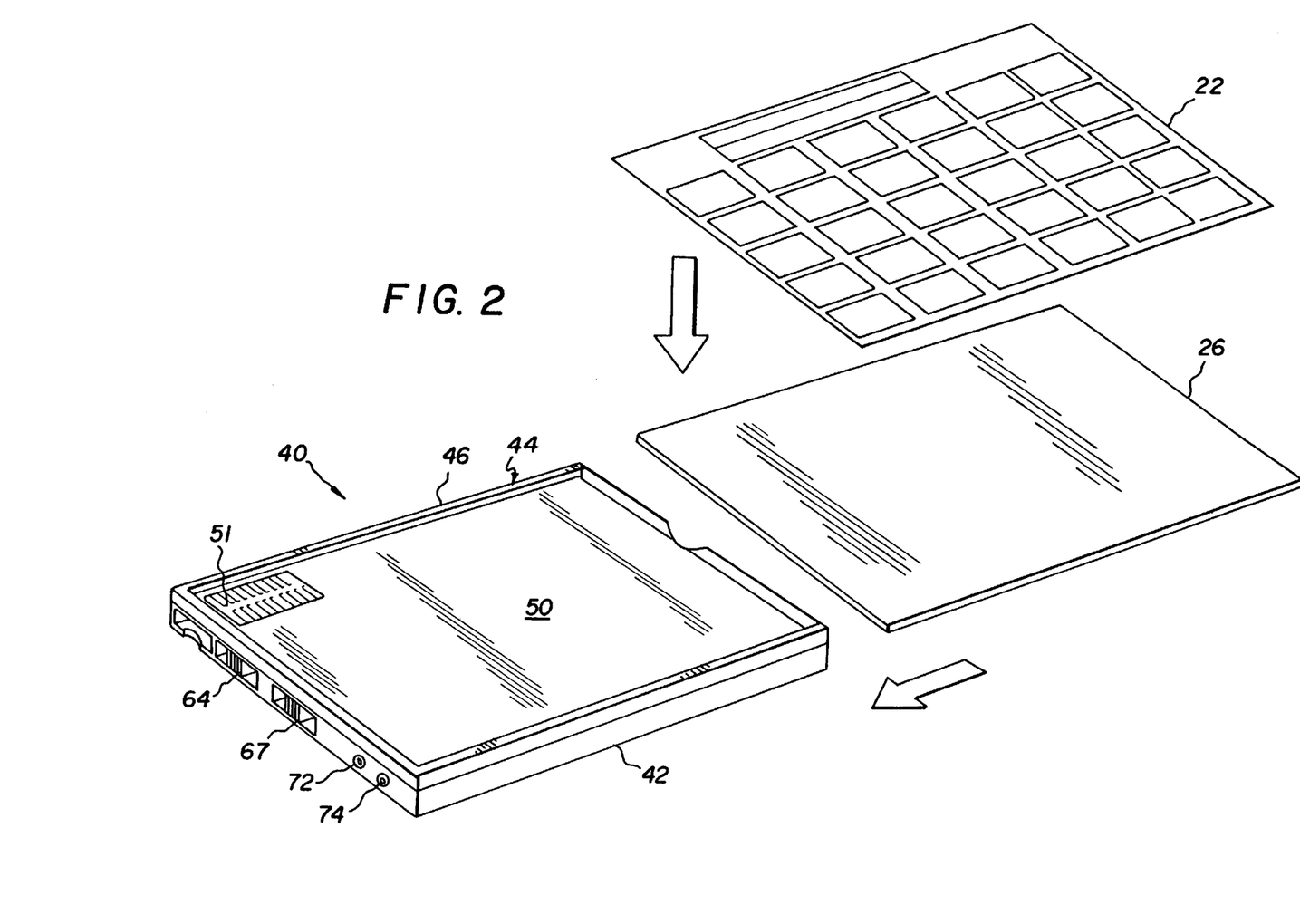
FIG. 2 is an exploded perspective view of the image print and sound player of FIG. 1.

Referring specifically to FIGS. 1 and 2, the index audio print 20 includes respective front and back layers 22 and 26 laminated together to define an integral construction such as that disclosed in pending U.S. application Ser. No. 08/796,232, entitled "Image-Audio Print, Method of Making and Player For Using", which is assigned to the assignee of the present invention and is hereby incorporated by reference in its entirety. The front layer 22 contains pictorial image information, such as a plurality of reduced-in-size index images 24 and identification information in the form of a header and title zone 25. The image information is recordable through conventional silver halide photography or other comparable processes, such as thermal dye transfer techniques, electrophotography, inkjet methods and the like. Moreover, digital image capture is also applicable as a recording means.

The back layer 26 of the image print comprises a thin rigid backing or support of approximately 0.3 mm to 3.0 mm in thickness. The support is formed with a recess 28 to nest an audio data storage unit 30. The rear of the unit is substantially flush with the rest of the back layer and includes a plurality of contacts 32 for coupling to a sound player interface 51. Preferably, the audio data storage unit comprises a randomly accessible nonvolatile memory, such as an EEPROM. A suitable example is the solid state floppy disc card (SSFDC) manufactured by Toshiba. The integral audio index print is configured for temporary or permanent mounting in the sound player 40.

With reference to FIGS. 1 and 2, the sound player 40 includes a formed rectangular housing 42 having a cover 44 formed with an external raised retainer wall 46. The cover overlays an internal compartment 48 for protecting an electronic module 60 and associated components that drive the player through its programmed functions. The retainer wall borders a flat support surface 50 for receiving the audio index print 20. An audio memory interface comprising a plurality of contacts 51 for engaging the index print audio memory contacts 32 is mounted to the support surface 50. A registration mechanism is provided to properly register the index print 20 on the support surface and ensure coupling between the audio data storage unit 30 and the interface and comprises at least one and preferably, a plurality of inwardly and laterally projecting leaf springs 52 disposed in the retainer wall 46.

Overlaying the support surface 50 is a transparent touch screen 54 which serves as a retainer cover and as an input mechanism to identify particular images on the index print 20 for audio playback. Three edges of the touch screen are anchored to the support surface 50 to form a pocket 56 for retaining an inserted index print. The touch screen is further formed with a semi-circular notch 58 defining a finger tab to enable straightforward ingress and egress of an index print with respect to the support surface. The touch screen preferably comprises a Matrix touch screen, manufactured by Touch Technology Inc., and supplies inputs to the sound player electronic module 60.

Further referring to FIGS. 1 and 2, the sound player includes a power source comprising a battery pack 62 and activated by a power switch 64. The power source drives the electronic module 60 which comprises a controller with an internal timer, such as a Motorola MC68HC805B6 microprocessor. Preferably, the processor includes internal memory in the form of EEPROM, as well. The processor controls audio data acquisition through an auxiliary microphone 66, which is responsive to a recording "enable" switch 67 and audio playback via an internal speaker 68. An LCD screen (not shown) mounted to the exterior of the sound player 40 responds to outputs from the processor to prompt various menu options for a user to select in carrying out specific functions. It is envisioned that the LCD may be mounted to the print holder 90 and coupler to the player 40. The LCD feature of the present invention is more specifically described in U.S. patent application Ser. No. 08/796,232. Respective externally accessible audio "out" and audio "in" jacks 72 and 74 are electrically coupled to the processor for providing flexibility in manually directing audio inputs and outputs.

Figures 4, 5:
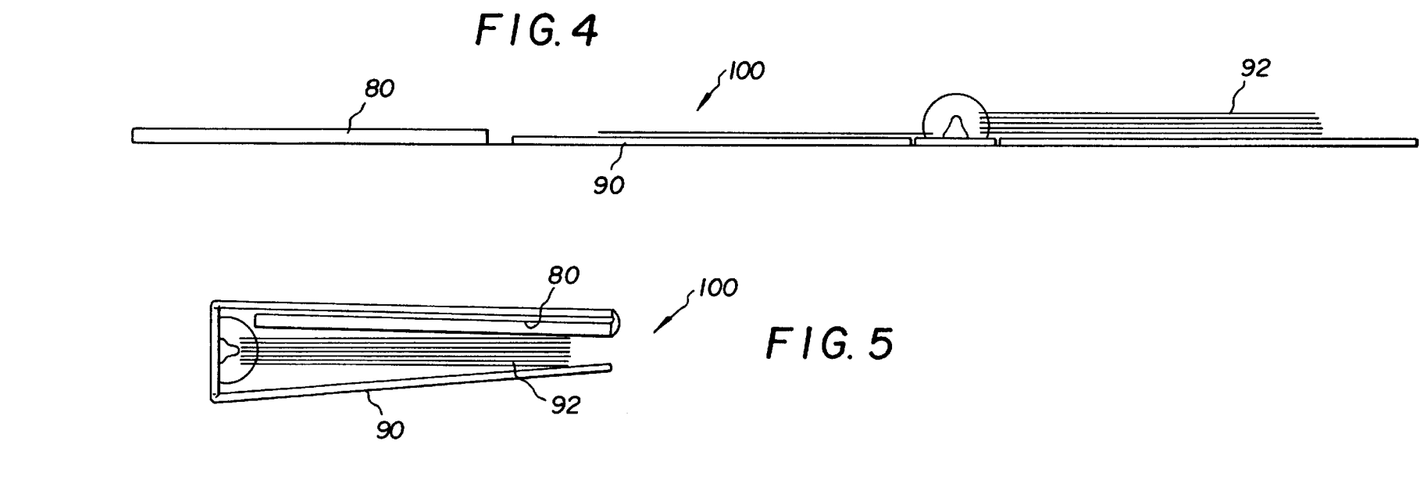
FIG. 4 is a front elevational view along line 4—4 of FIG. 3.
FIG. 5 is a front elevational view of the album of FIG. 4 in a closed state.

Referring now to FIGS. 3, 4 and 5, the index print 20 and sound player 40 together comprise a sound playback module 80 with one end hingedly mounted to a print holder 90 to define the photo album of the present invention 100. The print holder includes a plurality of photo album pages 92 for mounting respective image prints 94 that correspond to the reduced-in-size images included on the index print. The print holder may comprise any form of binder, folder or book for mounting image prints.

Assembly of the photo album 100 of the present invention involves attaching the sound player 40 to the print holder 90 in a hinged manner to effect convenient fold-out of the player upon opening of the album. This is typically performed by the manufacturer such that the purchaser obtains a blank photo album with an integrally installed sound player. Following purchase of the album by a user, one or more rolls of audio image film are typically shot and, upon photofinishing, result in one or more of the index prints 20 having the integral audio storage unit 30 retaining the associated audio bites for each image. The full size image prints 94 corresponding to the index print are mounted in the album in any order. The index print may then be installed onto the sound player support surface 50 such that the audio storage unit contacts 32 register with the sound player interface contacts 51.

In operation, a user desiring to process audio associated with a specific image print merely first activates the power switch 64, then touches the touch screen 54 over respective images on the index print 20 to activate the LCD screen (not shown). From the menu, the user can play-back audio already recorded, record a new audio bite, or copy a recorded bite to another sound bite location as more fully described in U.S. patent application Ser. No. 08/796,232.

Figure 6:
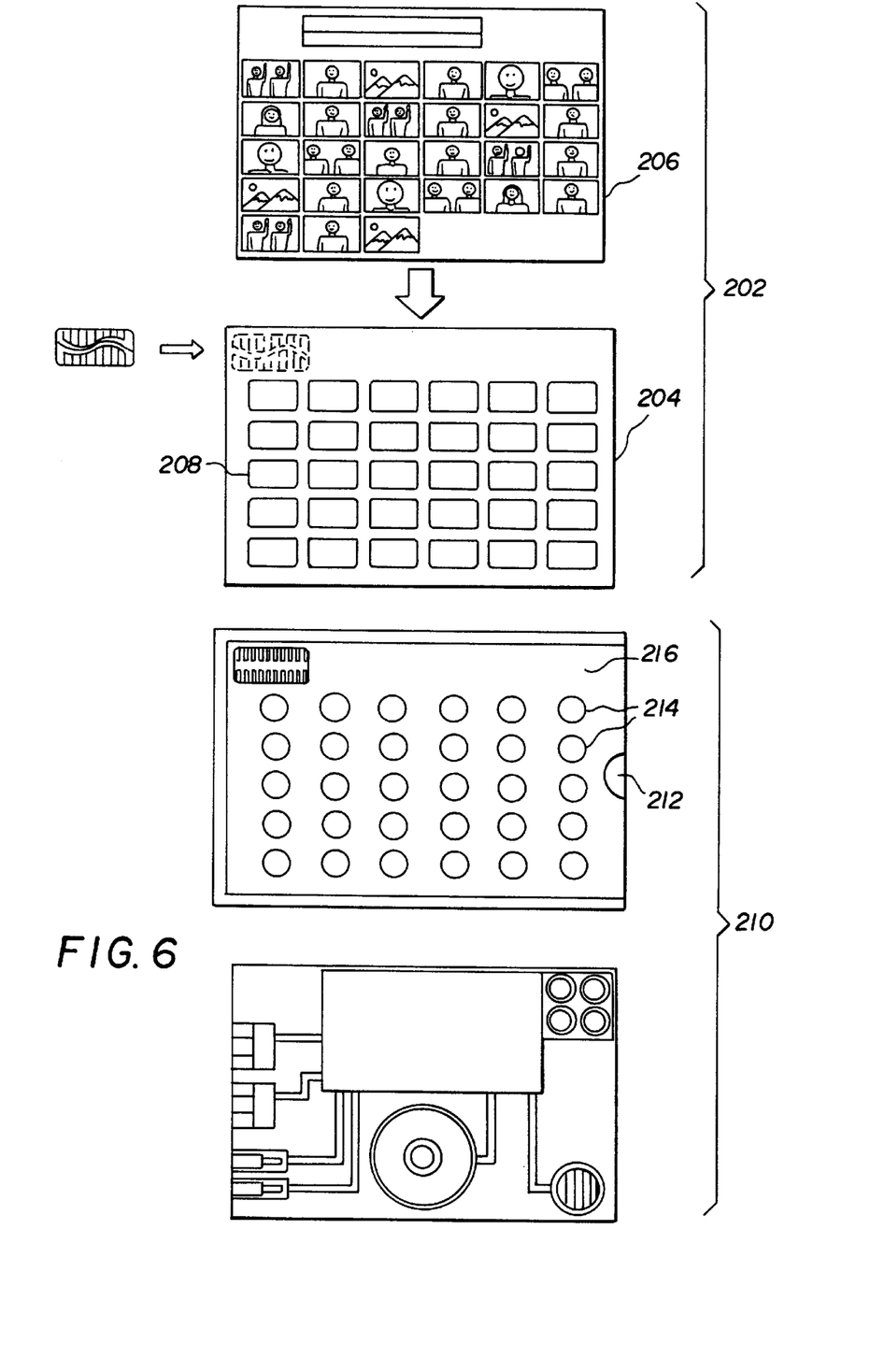
FIG. 6 is an exploded view of an image print and sound player according to a second embodiment of the present invention.
Figure 7:
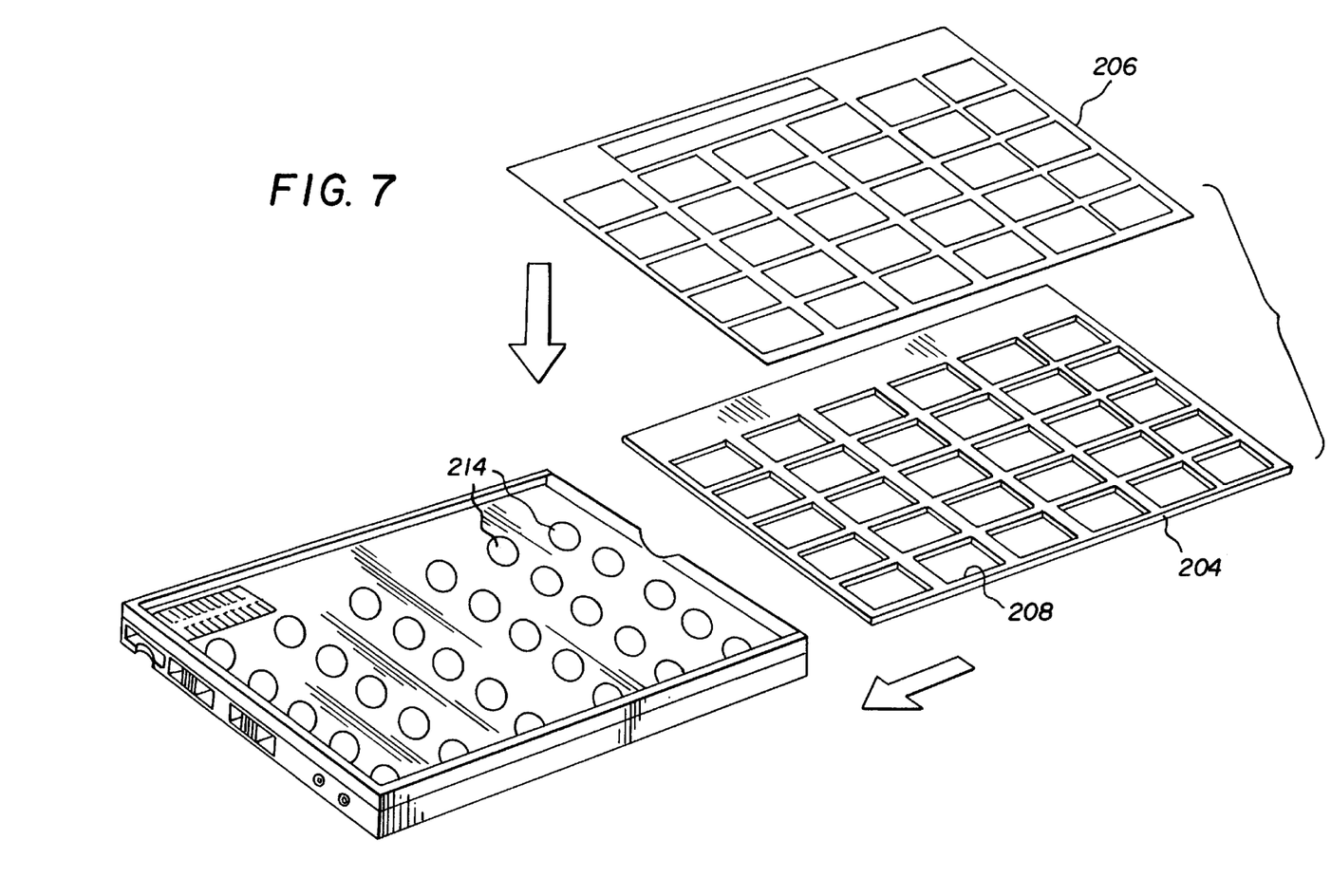
FIG. 7 is an exploded perspective view of the image print and sound player of FIG. 6.
Figure 8:
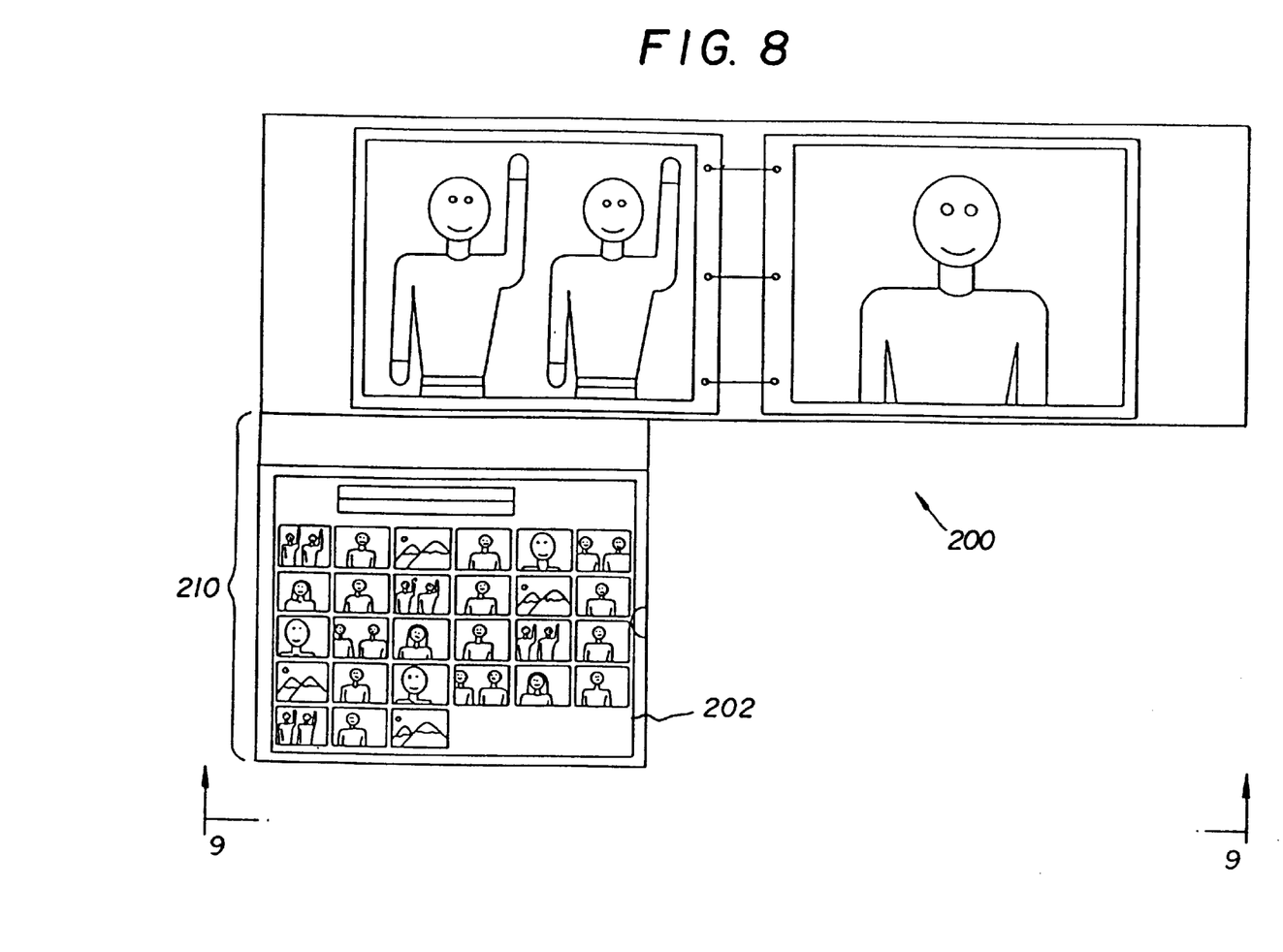
FIG. 8 is a top plan view similar to FIG. 3.

Referring now to FIGS. 6, 7, and 8, a second embodiment of the photo album of the present invention, generally designated 200, includes an index print 202 similar to that disclosed in the first embodiment but including a rigid backing 204 laminated to an image printed front layer 206 and formed with a matrix of apertures 208 in underlying alignment with the matrix of images on the front layer. This allows the respective images to be depressed slightly, when installed in a sound player 210, for activating corresponding audio segments.

The sound player 210 includes a support surface 212 that mounts a plurality of upwardly projecting membrane switches 214 to effect audio segment activation. The switches are aligned to complementally underlie the apertures 208 in the rigid backing 204 when an index print 202 is installed onto the support surface. A transparent index print cover 216 is secured to the edges of the support surface to define a protective pocket for an installed index print.

The sound player 210 is assembled to the photo album 200 (FIG. 8) in much the same manner as the first embodiment and operates quite similarly to the first embodiment as well. One difference includes the selecting of respective audio bites by depressing respective images on the index print to activate the membrane switches 214, rather than a slight touch on a touch screen.

Figure 9:
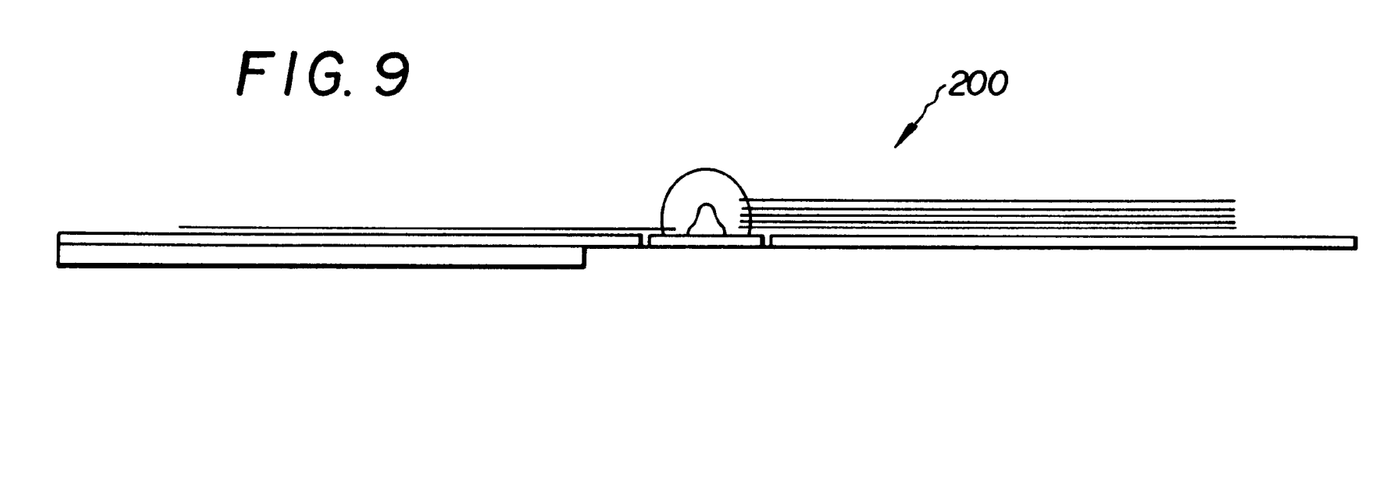
FIG. 9 is a front elevational view along line 9—9 of FIG. 8.
Figure 10:
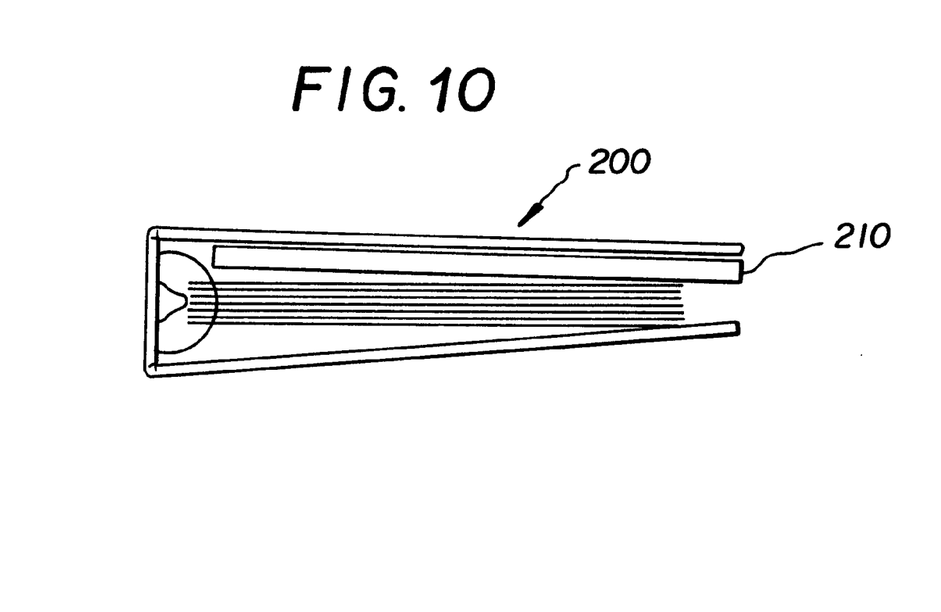
FIG. 10 is a front elevational view of the album of FIG. 9 in a closed state.

FIGS. 8 through 13 illustrate further embodiments of the sound player 210 and index print 202 in combination with the photo album 200. Although the previously described embodiment disclosed a fold-out construction for the sound module, it is anticipated that a fold-down version, illustrated in FIGS. 8 through 10, provides similar benefits in compactness.

Figure 11:
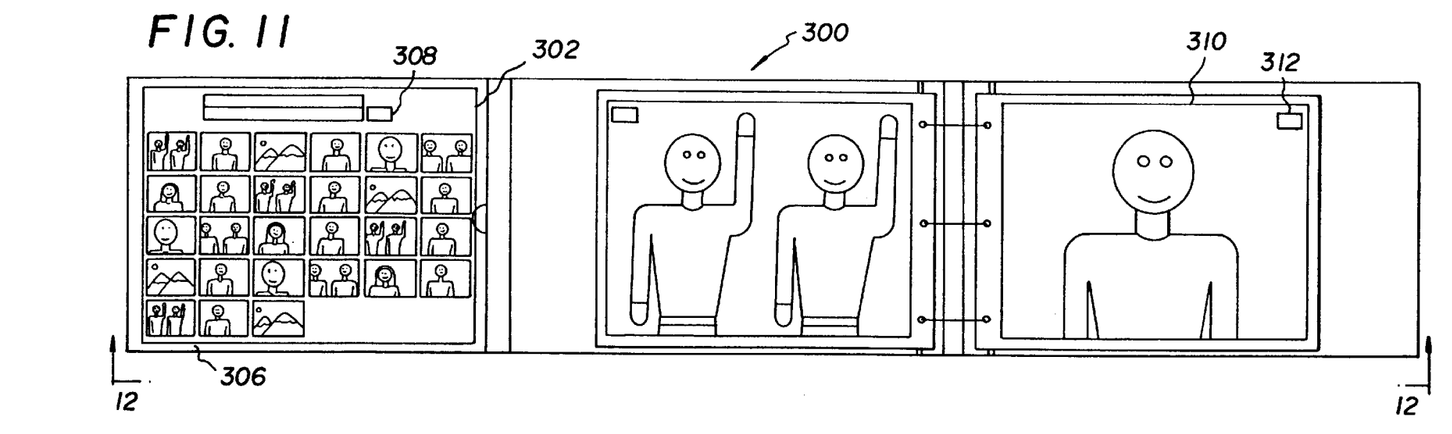
FIG. 11 is a top plan view of a further embodiment similar to FIG. 3.
Figure 12:
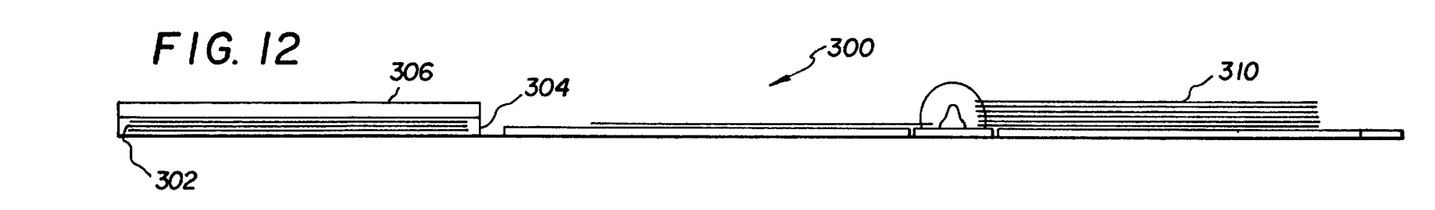
FIG. 12 is a front elevational view along line 12—12 of FIG. 11.
Figure 13:
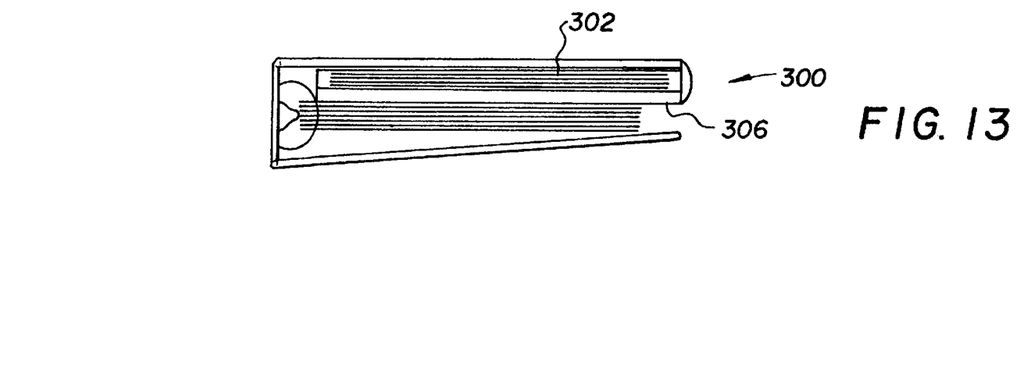
FIG. 13 is a front elevational view of the album of FIG. 11 in a closed state.

Moreover, as shown in FIGS. 11 through 13, a single photo album 300 may carry a plurality of index prints 302 in an index print storage unit 304 disposed behind a sound player 306. In such an embodiment, respective index prints are coded, such as by color codes 308 or numerical group codes (not shown), to relate to a plurality of individually coded full-size image prints 310 having corresponding codes 312.

Those skilled in the art will appreciate the many benefits and advantages offered by the present invention. One important advantage involves the convenient ability to process audio data in a photo album relating to a single image print without separating the captured audio data from the print. This feature prevents undesirable confusion and an additional level of organization to avoid mixing of audio associated with the wrong image prints. Moreover, the album employs image prints and index prints that avoid surface coding for audio playback, thereby preserving the aesthetic quality of the photo album collection.

While the invention has been particularly shown and described with reference to the preferred embodiments thereof, it will be understood by those skilled in the art that various changes in form and detail may be made therein without departing from the spirit and scope of the invention.

PARTS LIST

20 Index print
22 Front layer
24 Index image
25 Header/title area
26 Backing
28 Recess
30 Sound storage unit
32 Contacts
40 Sound player
42 Housing
44 Cover
46 Retainer wall
48 Internal compartment
50 Support Surface
51 Interface
52 Leaf springs
54 Transparent touch screen
56 Pocket
58 Fingertab
60 Electronic module
62 Battery pack
64 Power on/off switch
66 Auxiliary microphone
68 Speaker
72 Audio out jack
74 Audio in jack
80 Play back module
90 Print holder
92 Photo album pages
94 Image prints
100 Photo album (first embodiment)
200 Photo album (further embodiment)
202 Index print
204 Rigid backing
206 Front layer
208 Apertures
210 Sound player
212 Support surface
214 Membrane switches
216 Cover
300 Photo album (further embodiment)
302 Index prints
304 Index print storage unit
306 Sound player 308 Color code
310 Full-size image print
312 Full-size image print code

What is claimed is:

1. An album for storing a collection of full size image prints and at least one index print having reduced-in-size index images corresponding to said full size image prints, said at least one index print including an audio memory unit integral therewith to define an audio index print for storing audio data relating to said full size image prints, said album comprising:

a print holder having respective front and back covers and a plurality of pages configured for mounting said collection of full size image prints;

a sound player unit mounted to said print holder, said sound player unit including a housing having a support for mounting said audio index print and an electronic module; and an interface means for connecting said audio memory unit with said sound player;

whereby, when said audio index print is coupled to said player unit, said player unit is effective to communicate with the audio memory unit thereof to selectively process audio data related to said collection of full size image prints.

2. An album according to claim 1 wherein:

said housing is formed with a print support surface and a raised retainer wall disposed peripherally around said support surface, said retainer wall complementally formed to border said audio index print received on said support surface.

3. An album according to claim 2 wherein:

said support surface is formed with an audio index print memory interface, when said image print is disposed on said support surface, to couple to said audio index print memory unit and effect audio processing.

4. An album according to claim 3 wherein:

said retainer wall includes a registration mechanism which, when said image print is placed on said support surface, aligns said image print to register said audio index print memory unit with said audio index print memory interface.

5. An album according to claim 4 wherein:

said registration mechanism comprises at least one leaf spring.

6. An album according to claim 2 and further including:

a touchpad having at least one edge fixed to said support surface and having an image selection interface for overlaying said audio index print to effect selection of individual images in said index print through the touch of a user.

7. An album according to claim 2 wherein:

said support surface is formed with a matrix of membrane switches.

8. An album according to claim 1 wherein said sound player unit includes:

an audio playback device for reading said audio data from said index print memory unit and audibly communicates a message corresponding to said data;

a recorder for writing audio data to said index print memory unit; and said electronic module is operable to control said audio playback device and said recorder.

9. An album according to claim 1 wherein:

said sound player is hinged at one end to said print holder to effect a fold-out relationship with said print holder in an open state.

10. An album according to claim 1 wherein:

said sound player is hinged at one end to said print holder to effect a fold-down relationship with said print holder in an open state.

11. An album according to claim 1 wherein:

said at least one index print comprises a plurality of index prints, said plurality of index prints having respective codes each of which corresponds to respective related groupings of full size image prints of said collection.

12. An album according to claim 11 wherein:

said respective related groupings of said collection comprise respective groups of full size image prints, said prints including respective color indicators representing said groups; and said respective index print codes comprise respective colors to correlate index prints to said color indicators of said full size image print groups.

13. A method of presenting audio information associated with a full size image print mounted in a photo album as part of an image collection, said photo album including a sound player having electrical contacts, said method including the steps of:

selecting an index print having a plurality of reduced-in-size printed images corresponding to full size images in said collection, said index print including an integral audio memory unit for retaining a plurality of audio bites corresponding to respective ones of said reduced-in-size images having interface contacts;

securing said index print to said sound player with said interface contacts in communication with said sound player electrical contacts; and selecting one or more of said index print images to activate a specific sound bite related to a full size image corresponding to that displayed on said selected index print image.

14. A method according to claim 13 wherein said step of activating includes the step of:

touching a specific image displayed on said index print; and recording an audio bite corresponding to said touched image.

15. A method according to claim 13 wherein said step of activating includes the step of:

touching a specific image displayed on said index print; and playing an audio bite corresponding to said touched image.

* * * * *